US008688419B2

(12) United States Patent
Saintis

(10) Patent No.: US 8,688,419 B2
(45) Date of Patent: Apr. 1, 2014

(54) METHOD FOR PREDICTING THE OPERATIONAL RELIABILITY OF AN AIRCRAFT SYSTEM

(75) Inventor: Laurent Saintis, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 952 days.

(21) Appl. No.: 11/968,417

(22) Filed: Jan. 2, 2008

(65) Prior Publication Data

US 2008/0177515 A1 Jul. 24, 2008

(30) Foreign Application Priority Data

Jan. 3, 2007 (FR) ...................................... 07 52510

(51) Int. Cl.
*G06G 7/48* (2006.01)
(52) U.S. Cl.
USPC ............................................................ 703/6
(58) Field of Classification Search
USPC ........................................................ 703/2, 6
See application file for complete search history.

(56) References Cited

PUBLICATIONS

L. Saintis et al., "Computing In-Service Aircraft reliability", Dec. 1, 2006, Institut de Mathématiques de Toulouse, pp. 1-22.*
E. Hugues, et al., "Methods to assess the operational realiability of an aircraft system: problem of dependency between component states", LAAS Report No. 06449, XP 008083016, Jun. 2006, 16 pages.
E. Hugues et al., "Methods to assess the operational realiability of an aircraft system: problem of dependency between component state", Rapport LAAS No. 06449, XP 002452515, 2007, 1 page.
E. Hugues et al., "ORA model & tool for Operational Realiability Prediction within Airbus", Actes du 14ème Congrés de Maîtrise des Risques et de Sûreté de Fonctionnement, XP 008083466, Oct. 12-14, 2004, pp. 448-451.
L. Saintis, et al., "Computing In-Service Aircraft Realiability", LAAS Report No. 07027, XP-008083015, Jan. 2007, pp. 1-22 with a front and end pages.
L. Saintis, et al., "Computing In-Service Aircraft Realiability", XP-002452517, Jul. 3, 2007, pp. 1-24.
James Loman, et al., "On Realiability Modeling and Analysis of Highly-Realiable Large Systems", RAMS Symposium 2002, pp. 456-459.
E. Hugues, et al., "Application of Markov processes to predict aircraft operational realiability", 3$^{rd}$ European Systems Engineering Conference (EUSEC), May 21-24, 2002, pp. 231-235.
Zhihua Tang, et al., "Minimal Cut/Sequence Generation for Dynamic Fault Trees", RAMS 2004, pp. 207-213.
J.D. Esary, et al., "Coherent Structures of Non-Identical Components", Technologies vol. 5, No. 2, May 1963, pp. 191-209.

* cited by examiner

*Primary Examiner* — Kamini S Shah
*Assistant Examiner* — Russ Guill
(74) *Attorney, Agent, or Firm* — Oblon, Spivak, McClelland, Maier & Neustadt, L.L.P.

(57) ABSTRACT

The present invention relates to a method for predicting the reliability of an aircraft system (S) onboard an aircraft, constituted by a plurality of elements. The operation of the aircraft is constituted by a sequence of cycles, each cycle comprising a flight phase and a ground station phase. The method of reliability prediction allows in particular calculation of the breakdown probability of the aircraft system at each cycle of operation of the aircraft. The present invention can also estimate the rate of operational interruption of this system.

10 Claims, 6 Drawing Sheets

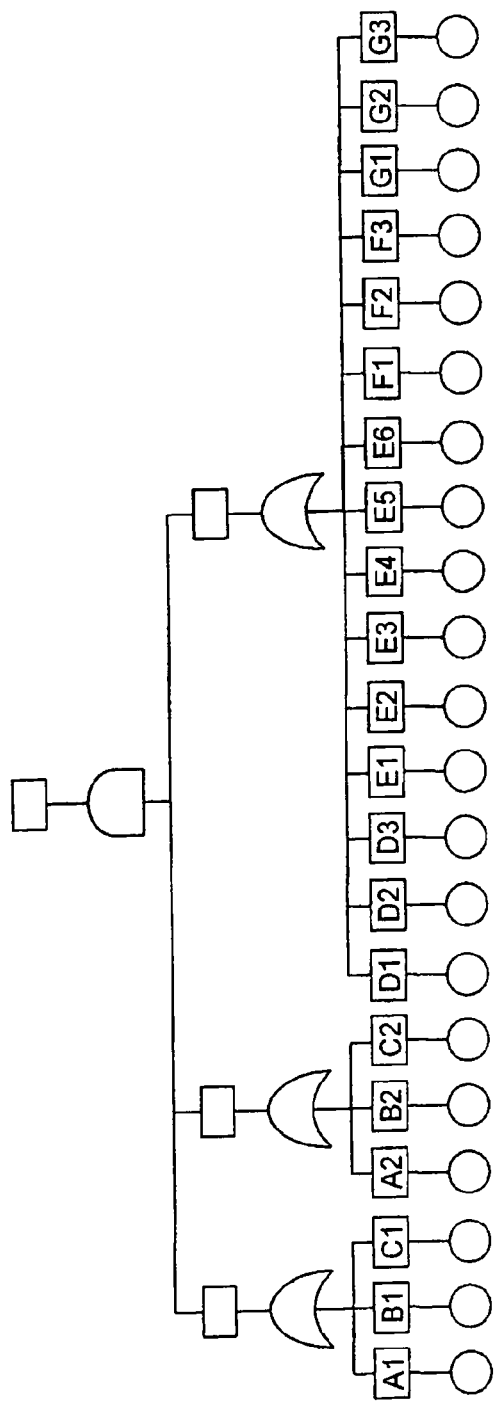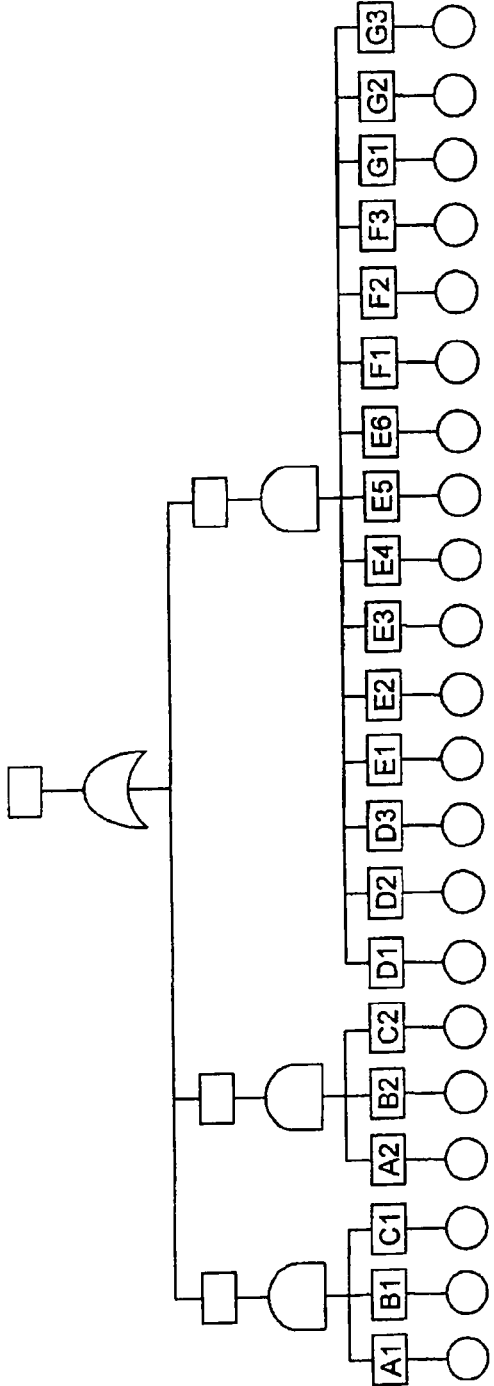

METHOD FOR PREDICTING THE OPERATIONAL RELIABILITY OF AN AIRCRAFT SYSTEM

TECHNICAL FIELD

The present invention relates to the field of operational reliability and maintenance of an aircraft.

PRIOR ART

Operational reliability is one of the essential criteria to be taken into account during the design phase of an aircraft. It characterises the availability of the latter during its operational phase. The operational reliability of the aircraft is a function of the frequency of its running interruptions also known as <<operational interruptions>>, caused by breakdowns or maintenance operations following these breakdowns. Examples of operational interruptions are especially delays in takeoff greater than a predetermined threshold value, flight cancellations, rerouting and even returns to the airport of departure. These operational interruptions are penalizing in terms of time and cost for flight companies.

In order to reduce the operational interruption rate, the aircraft manufacturer can utilise more reliable components or increase their redundancy, increase the frequency of preventive maintenance tasks or even optimise the architecture of the aircraft systems. However, given the complexity of these systems and the number of components they comprise, it is difficult to determine the impact of any one characteristic of a component or modification of the system architecture upon the operational interruption rate of the aircraft.

It has been proposed in the article by J. Loman and W. Wang entitled <<On reliability modeling and analysis of high reliable large systems>> RAMS Symposium 2002, pages 456-459 to employ simulation of Monte-Carlo type. However, to obtain the preferred degree of precision (margin of precision between $10^{-4}$ and $10^{-7}$) on the probability of operational interruption during a given flight the quantity of simulations to be carried out is much too high.

Modelling the evolution of the aircraft by a Markov process has been proposed in the article by E. Hugues et al. entitled <<Application of Markov processes to predict aircraft operational reliability>>, 3rd European Systems Engineering Conference (EUSEC), Toulouse, 21-24 May 2002, pages 231-235. However, since the number of statuses to be envisaged depends exponentially on the number of components of the system, this modelling proves unusable in practice even for moderately complex systems.

Also, default tree analysis according to classic reliability theory does not take into account the evolution of a dynamic system. More precisely, this theory calculates the breakdown probability of a system as a function of the default tree and the breakdown probabilities of its constitutive elements. This approach is purely static. It is known, especially from the article by Z. Tang et al. entitled <<Minimal cut set/sequence generation for dynamic fault tree>> to utilise dynamic default trees to describe evolutive systems. However, in practice it is impossible to extract the minimal cut sequences (minimal cut set) in a reasonable time once the system is complex, such as an aircraft for example.

The first problem underlying the invention is to propose a method for predicting the operational reliability and more precisely the operational interruption rate of an aircraft system, in particular of an aircraft, with a low margin of error and limited calculatory resources. Here, aircraft system is understood to mean any onboard aircraft system fulfilling a predetermined function and constituted by electronic, electric, mechanical, hydraulic or other elements.

An auxiliary problem to that of predicting the operational interruption rate of an aircraft system is that of estimating the probabilities of maintenance and replacement of such a system when it breaks down.

EXPLANATION OF THE INVENTION

The present invention is defined by a method for predicting the reliability of an aircraft system onboard an aircraft, constituted by a plurality of elements, the running of said aircraft comprising a sequence of cycles, each cycle comprising a flight phase and a ground station phase, characterised in that it comprises:

an initialization step of the probabilities of good operation or failure of each element at the beginning of the said operation;

and an iterative loop, each iteration corresponding to an operation cycle and including:

a first estimation step, for each element, of the upper and lower bounds of the conditional breakdown probability of the system if the said element breaks down during said cycle, the estimation being made from minimal cuts of the default tree, minimal paths of reliability diagram of said system and upper and lower bounds of probability of good operation or faultiness of the different elements at the beginning of said cycle;

a second estimation step of the upper and lower bounds of the breakdown probabilities of said system from upper and lower bounds estimated at the first step for said different elements of the system and respective probabilities of the different elements of the system for breakdown during a cycle;

a third estimation step, for each element of said system, of the upper and lower bounds of the conditional breakdown probability of the system during said cycle if the said element were faulty at the beginning of the cycle, the estimation being made from minimal cuts of the default tree and minimal paths of reliability diagram of said system;

a fourth estimation step of the upper and lower bounds of probability of good operation or faultiness of the different elements of the system at the beginning of the following cycle, from upper and lower bounds estimated by the first step, as well as upper and lower bounds estimated by the third step.

At each cycle the breakdown probability of said system is advantageously predicted as the upper bound of breakdown probability of said system.

The invention also relates to a method for predicting the operational interruption rate of an aircraft system onboard an aircraft and constituted by a plurality of elements, the operation of said aircraft comprising a sequence of cycles, each cycle comprising a flight phase and a ground station phase. According to this method for predicting the operational interruption rate, the reliability of said system is predicted as previously and at each said iteration the upper and lower bounds of probability of operational interruption of said system are estimated in the absence of breakdown of the latter, the estimation of the upper bound of probability of operational interruption being obtained from the respective lower bounds of the conditional probabilities of breakdown of the system during said cycle for each element breaking down during this cycle, as well as of the respective upper bounds of the probabilities that each element functions at the beginning of said cycle.

The invention further relates to a method for predicting the operational interruption rate of an aircraft system onboard an aircraft and constituted by a plurality of elements, the operation of said aircraft comprising a sequence of cycles, each cycle comprising a flight phase and a ground station phase. According to this method for predicting the operational interruption rate, the reliability of said system is predicted as previously, and at each said iteration the upper and lower bounds of probability of operational interruption of said system are estimated in case of breakdown of the latter, the estimation of the upper bound of probability of operational interruption being obtained from the respective upper bounds of the conditional probabilities of breakdown of the system during said cycle for each element of the system breaking down during the cycle, of the respective upper bounds of the conditional probabilities of breakdown of the system for each default element at the beginning of said cycle, the respective upper bounds of the probabilities of good operation of each element at the beginning of the cycle as well as an upper bound of breakdown probability of the system during the cycle, the estimation of the lower bound of probability of operational interruption being obtained from the respective lower bounds of the conditional probabilities of breakdown of the system during said cycle for each element of the system breaking down during the cycle, the respective lower bounds of the conditional probabilities of breakdown of the system for each default element at the beginning of said cycle, the respective lower bounds of the probabilities of good operation of each element at the beginning of the cycle, as well as a lower bound of breakdown probability of the system during the cycle.

BRIEF DESCRIPTION OF THE DRAWINGS

Other characteristics and advantages of the invention will emerge from the description of a preferred embodiment of the invention made in reference to the attached figures, in which:

FIG. 2A illustrates the default tree of an example of an aircraft system;

FIG. 2B illustrates the tree of good operation of the same system;

DETAILED EXPLANATION OF PARTICULAR EMBODIMENTS

Figure 1:
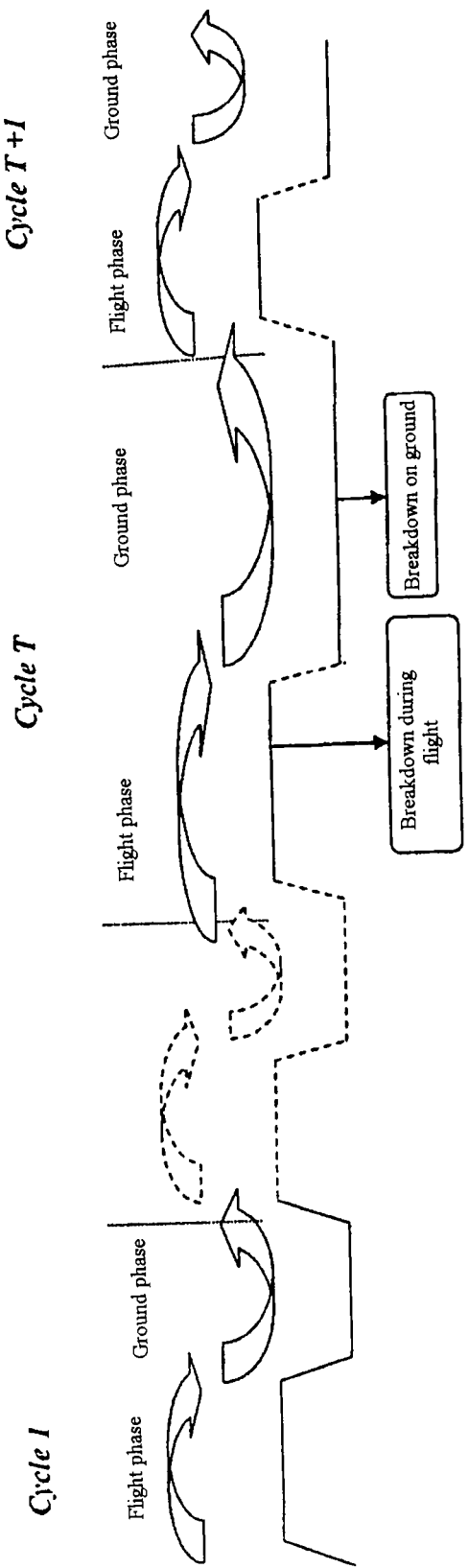
FIG. 1 illustrates a sequence of operation cycles of an aircraft.

Operation of an aircraft is constituted by a sequence of cycles as illustrated schematically in FIG. 1. Each cycle comprises a flight phase and a ground station phase, the latter able to comprise maintenance actions. During each of these phases a breakdown can occur.

We shall consider hereinafter the breakdowns affecting an aircraft system, the aircraft itself being able to be viewed as a particular aircraft system. In general, each aircraft system is constituted by a plurality of elements and performs a predetermined function (for example a positioning function for the inertial system).

If an element x breaks down during a cycle T, it can cause total loss TL (Total Loss) of the system. Total system loss is known as a breakdown necessitating replacement of this system. The relations between the breakdowns of the elements and the total system loss are described by a default tree (fault tree). This tree indicates by means of combinatory logic how the individual breakdowns of the elements affect the aircraft system.

An example of default tree is given in FIG. 2A for an aircraft system S constituted by 21 elements $A_1, A_2; B_1, B_2; C_1, C_2; D_1, D_2, D_3; E_1, \ldots, E_6; F_1, F_2, F_3; G_1, G_2, G_3$. In this diagram, the circles represent elementary events, the rectangles combinations of events. A rectangle including the reference of an element is the event corresponding to a breakdown of this element.

A cut is defined as a breakdown of a set of elements of the system (cut set) causing total loss thereof. Minimal cut (minimal cut) is a cut containing no other cut.

It can be shown that the event of total loss corresponds to:

$$TL = \bigcup_{m=1}^{M} C_m \qquad (1)$$

where the $C_m$, m=1, ..., M are the minimal cuts of the default tree, that is:

$$C_m = \bigcap_{i=i_1}^{i_m} \overline{E_i}$$

where $\overline{E_i}$ is the event corresponding to the element i in breakdown.

The state of the system can be alternatively illustrated by a dual tree known as reliability diagram (or more precisely tree of good operation). FIG. 2B illustrates the tree of good operation corresponding to the default tree of FIG. 2A.

It is evident that the system S functions only if there is at least one path between an input and the output of the diagram such that all the elements of this path are not faulty. A minimal path is defined as any path containing no other path. It is evident that the event of non-total loss corresponds to:

$$\overline{TL} = \bigcup_{k=1}^{K} P_k \qquad (2)$$

where the $P_k$, k=1, ..., K are the minimal paths of the reliability diagram, that is:

$$P_k = \bigcap_{j=j_1}^{j_k} E_j$$

where $E_j$ is the event corresponding to the element j running.

An element which breaks down does not necessarily cause breakdown of the system to which it belongs. For example, if the system is redundant, there could be minimal path not containing this element. In this case, even though the system continues to ensure its function, its reliability will be degraded. When a system is in this mode, noted hereinbelow as DM (degraded mode), two options are possible:

accepting the system in degraded mode, if need be by configuring the default element during a ground maintenance task;

refusing the system in degraded mode, in which case the default element must be replaced.

Figure 3:
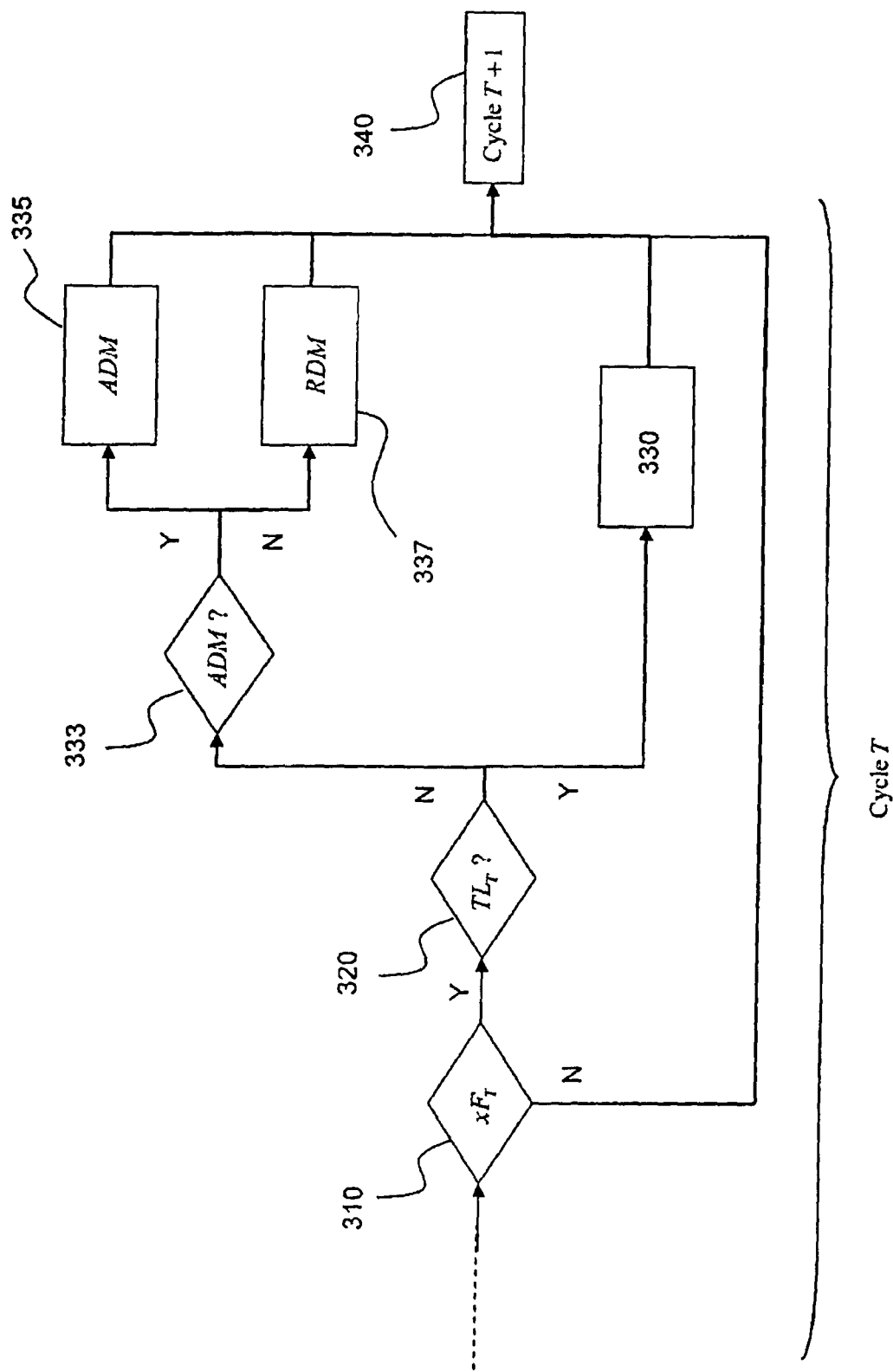
FIG. 3 schematically illustrates the different states of a system during a cycle of operation.

FIG. 3 recapitulates the different situations possible on completion of a cycle T. In 310, verification is made for a default element. In the negative, the following cycle starts at 340. In the affirmative, verification is made in 320 if a loss of function has occurred, that is, if there is total system loss S. In the affirmative, replacement or repair of all the faulty elements of the system are commenced in 330. In the negative, it is decided in 333 if an operation in degraded mode is acceptable. If this is the case, any possible maintenance operations are commenced in 335 and the following operation cycle starts at 340. The event corresponding to the decision to continue in degraded mode is noted ADM. However, if the operation in degraded mode is not acceptable, repairs or exchange of the default element are started (and only of the latter) prior to starting the following cycle. The event corresponding to a refusal to continue in degraded mode is noted RDM.

It will be presumed hereinbelow that the probabilities of breakdown affecting different elements of a system are independent. The case where several elements of a system break down throughout a given cycle will also be ignored. In practice, these hypotheses are verified such that they do not entail loss of generality.

Figure 4:
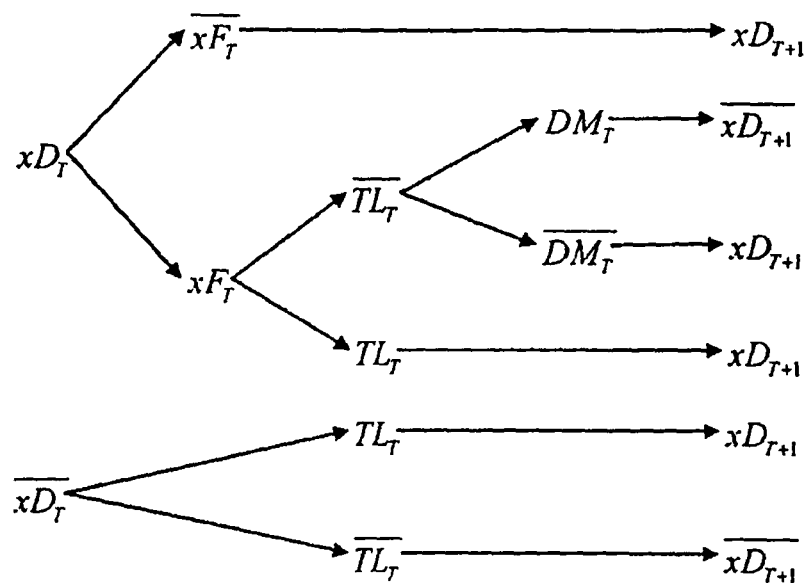
FIG. 4 illustrates the diagram of events which might affect an element of a system during a cycle of operation.

FIG. 4 illustrates a diagram of the events which can occur throughout a cycle T. It is noted in the figure:

$xD_T$, the event corresponding to proper functioning of the element x at the beginning of the cycle T; $\overline{xD_T}$ is the complementary event;

$xF_T$: the event corresponding to breakdown of the element x during the cycle T; $\overline{xF_T}$ is the complementary event;

$TL_T$ is the event corresponding to total system loss during the cycle T; $\overline{TL_T}$ is the complementary event;

$DM_T$ is the event corresponding to the decision of the cycle T to continue the operation in degraded mode, despite the breakdown of x; $\overline{DM_T}$ is the event corresponding to the inverse decision.

These same notation conventions apply similarly to following cycle T+1.

A first idea underlying the invention is to provide iteratively an upper and lower bounding of the probabilities of events TL (total loss causing replacement/repair of the set of elements faulty), ADM (operation in degraded mode accepted, subject to possible maintenance), RDM (operation in degraded mode refused and thus replacement/repair of the default element). A major advantage of the present invention is to propose an analytical formulation of the upper and lower bounds, which rapidly produces a prediction of the reliability of the system.

If a total system loss S occurs during a cycle T, this implies that an element of this system has necessarily broken down during this cycle, which can be expressed by the partition:

$$TL_T = \bigcup_{x \in S} (TL_T \cap xF_T \cap xD_T) \quad (3)$$

Given that a single element of S can break down during a cycle T, the events $\{xF_T\}_{x \in S}$ are disjointed, which translates into terms of probabilities by:

$$Pr\{TL_T\} = \sum_{x \in S} Pr\{TL_T \mid xF_T \cap xD_T\} \times Pr\{xF_T \mid xD_T\} \times Pr\{xD_T\} \quad (4)$$

where $Pr\{X|Y\}$ the conditional probability of the event X relative to the event Y is noted.

It is deduced from the diagram of events of FIG. 4 that the event $ADM_T$ can decompose by means of the following partition:

$$ADM_T = \bigcup_{x \in S} (ADM_T \cap \overline{TL_T} \cap xF_T \cap xD_T) \quad (5)$$

which translates into terms of:

$$Pr\{ADM_T\} = \sum_{x \in S} Pr\{ADM_T \mid \overline{TL_T} \cap xF_T \cap xD_T\} \times \quad (6)$$
$$(1 - Pr\{TL_T \mid xF_T \cap xD_T\}) \times Pr\{xF_T \mid xD_T\} \times Pr\{xD_T\}$$

Similarly, the event $RDM_T$ can decompose by means of the following partition:

$$RDM_T = \bigcup_{x \in S} (RDM_T \cap \overline{TL_T} \cap xF_T \cap xD_T) \quad (7)$$

which translates into terms of probabilities:

$$Pr\{RDM_T\} = \sum_{x \in S} Pr\{\overline{ADM_T} \mid \overline{TL_T} \cap xF_T \cap xD_T\} \times \quad (8)$$
$$(1 - Pr\{TL_T \mid xF_T \cap xD_T\}) \times Pr\{xF_T \mid xD_T\} \times Pr\{xD_T\}$$

The passage from one iteration to the next is obtained by remarking that, according to the diagram of FIG. 4:

$$\overline{xD_{T+1}} = (\overline{xD_T} \cap \overline{TL_T}) \cup (ADM_T \cap \overline{TL_T} \cap xF_T \cap xD_T) \quad (9)$$

and thus, in terms of probabilities:

$$Pr\{\overline{xD_{T+1}}\} = \quad (10)$$
$$Pr\{\overline{xD_T}\} - Pr\{TL_T \cap (\overline{xD_T})\} + Pr\{ADM_T \mid \overline{TL_T} \cap xF_T \cap xD_T\} \times$$
$$(1 - Pr\{TL_T \mid xF_T \cap xD_T\}) \times Pr\{xF_T \mid xD_T\} \times Pr\{xD_T\}$$

If a minimal cut $MC^i$, $1 \leq i \leq k$, of the default tree of the system S is now considered and if $MC_T^i$ is noted as the event corresponding to joint breakdown of all elements of $MC^i$ occurring during the cycle T it can be shown that there are the following upper bounds, $\forall x, y \in S$ with $x \neq y$:

$$Pr\{MC_T^i \mid xF_T \cap xD_T\} \leq \begin{cases} \dfrac{\prod_{\substack{y \in MC^i \\ y \neq x}} Pr\{\overline{yD_T}\}}{Pr\{xD_T\}} & \text{if } x \in MC^i \\ 0 & \text{else} \end{cases} \quad (11)$$

and $$Pr\{MC_T^i \cap yF_T \cap yD_T \cap \overline{xD_T}\} \leq \qquad (12)$$

$$\begin{cases} Pr\{yF_T \mid yD_T\} \times \left( \prod_{\substack{z \in MC^i \\ z \neq x, z \neq y}} Pr\{\overline{zD_T}\} \right) \times Pr\{\overline{xD_T}\} & \text{if } y \in MC^i \\ 0 & \text{else} \end{cases}$$

Of course, in the preceding inequalities (11) and (12), when it a term of probability is indicated as less than or equal to 0, this means that it is effectively equal to 0.

These upper bounds bring in the fact that, for any couple x,y of distinct elements of S, it can be supposed that, if there is $P(\overline{yD_T}) \neq 0$:

$$P(\overline{xD_T} \mid \overline{yD_T}) \leq P(\overline{xD_T}) \qquad (13)$$

This translates the finding that an element x has less chance of being in breakdown if an element y is. In fact, the latter can cause total system loss in which case the elements x and y will both be replaced/repaired during the cycle.

Given that $Pr\{\overline{xD_T} \cap \overline{yD_T}\} = Pr\{\overline{xD_T} \mid \overline{yD_T}\} \times Pr\{\overline{yD_T}\}$ the inequality (13) can still be written:

$$Pr\{\overline{xD_T} \cap \overline{yD_T}\} \leq Pr\{\overline{xD_T}\} \times Pr\{\overline{yD_T}\} \qquad (14)$$

and more generally, for $x \in S$ and a set of elements $A \subset S$ with $x \notin A$:

$$Pr\left\{\overline{xD_T} \cap \left( \bigcap_{y \in A} (\overline{yD_T}) \right)\right\} \leq Pr\{\overline{xD_T}\} \times Pr\left\{ \bigcap_{y \in A} (\overline{yD_T}) \right\} \qquad (15)$$

Similarly, if a minimal path $MP^j$, $1 \leq j \leq p$, is considered in the reliability diagram of the system S and if $MP_T^j$ is denoted as the event corresponding to good operation of all the elements of $MP^j$ during the cycle T, it can be shown that the following upper bounds, $\forall x,y \in S$ with $x \neq y$:

$$Pr\{MP_T^j \mid xF_T \cap xD_T\} \leq \begin{cases} 0 & \text{if } x \in MP^j \\ \prod_{y \in MP^j} Pr\{yD_T\} & \text{else} \end{cases} \qquad (16)$$

and $$Pr\{MP_T^j \cap yF_T \cap yD_T \cap \overline{xD_T}\} \leq \qquad (17)$$

$$\min\left( Pr\{yF_T \mid yD_T\} \times \left( \prod_{z \in MP^j} Pr\{zD_T\} \right) \times Pr\{yD_T\},\right.$$

$$\left. Pr\{yF_T \mid yD_T\} \times Pr\{\overline{xD_T}\} \right)$$

if $x \in MP^j$ or $y \in MP^j$
and $Pr\{MP_T^j \cap yF_T \cap yD_T \cap \overline{xD_T}\} \leq 0$ if not.

Also, by using the Esary-Proschnan theorem such as explained for example in the article by the same authors entitled <<Coherent structures of non-identical components>>, Technometrics 5, 1963, pages 191-209, from decomposition of the default tree of S into minimal cuts and properties (11), (12), the following inequalities are obtained, $\forall x \in S$:

$$Pr\{TL_T \mid xF_T \cap xD_T\} \leq 1 - \prod_{\substack{i=1 \\ x \in MC^i}}^{k} \left( 1 - \frac{\prod_{\substack{y \in MC^i \\ y \neq x}} Pr\{\overline{yD_T}\}}{Pr\{\overline{xD_T}\}} \right) \qquad (18)$$

$$Pr\{TL_T \cap \overline{xD_T}\} \leq \sum_{\substack{y \in S \\ y \neq x}} Pr\{yF_T \mid yD_T\} \times \qquad (19)$$

$$\left( 1 - \prod_{\substack{i=1 \\ y \in MC^i}}^{k} \left( 1 - \frac{\prod_{\substack{z \in MC^i \\ z \neq x \\ z \neq y}} Pr\{\overline{zD_T}\}}{Pr\{yD_T\}} \right) \right) \times Pr\{\overline{xD_T}\}$$

Similarly, by using this same theorem, the following lower bounds can be obtained from decomposition of the tree dual of the default tree of S into minimal paths and properties (16), (17), $\forall x \in S$:

$$Pr\{TL_T \mid xF_T \cap xD_T\} \geq \prod_{\substack{j=1 \\ x \notin MP^j}}^{p} \left( 1 - \prod_{y \in MP^j} Pr\{yD_T\} \right) \qquad (20)$$

and $$Pr\{TL_T \cap \overline{xD_T}\} \geq \qquad (21)$$

$$\sum_{\substack{y \in S \\ y \neq x}} \prod_{\substack{j=1 \\ x,y \notin MP^j}}^{p} \left( Pr\{yF_T \mid yD_T\} \times Pr\{yD_T\} \times Pr\{\overline{xD_T}\} - \right.$$

$$\min\left( Pr\{yF_T \mid yD_T\} \times \left( \prod_{z \in MP^j} Pr\{zD_T\} \right) \times Pr\{yD_T\}, \right.$$

$$\left.\left. Pr\{yF_T \mid yD_T\} \times Pr\{\overline{xD_T}\} \right) \right)$$

The probability of total system loss S during the cycle T can be increased, according to (4), by the upper bound:

$$UB(TL_T) = \sum_{x \in S} UB(TL_T \mid xF_T \cap xD_T) \times Pr\{xF_T \mid xD_T\} \times UB(xD_T) \qquad (22)$$

Similarly, the probability of total system loss S can be lower bounded by:

$$LB(TL_T) = \sum_{x \in S} LB(TL_T \mid xF_T \cap xD_T) \times Pr\{xF_T \mid xD_T\} \times LB(xD_T) \qquad (23)$$

The probability of accepting a degraded mode of operation in terms of the cycle T is upper bounded, according to (6), by the upper bound:

$$UB(ADM_T) = \sum_{x \in S} Pr\{ADM_T \mid \overline{TL_T} \cap xF_T \cap xD_T\} \times \qquad (24)$$

$$(1 - LB(TL_T \mid xF_T \cap xD_T)) \times Pr\{xF_T \mid xD_T\} \times UB(xD_T)$$

and lower bounded by the lower bound:

$$LB(ADM_T) = \sum_{x \in S} Pr\{ADM_T \mid \overline{TL_T} \cap xF_T \cap xD_T\} \times \qquad (25)$$
$$(1 - UB(TL_T \mid xF_T \cap xD_T)) \times Pr\{xF_T \mid xD_T\} \times LB(xD_T)$$

Finally, the probability of refusing a degraded mode of operation during the cycle T is upper bounded, according to (8), by the upper bound:

$$UB(RDM_T) = \sum_{x \in S} (1 - Pr\{ADM_T \mid \overline{TL_T} \cap xF_T \cap xD_T\}) \times \qquad (26)$$
$$(1 - LB(TL_T \mid xF_T \cap xD_T)) \times Pr\{xF_T \mid xD_T\} \times UB(xD_T)$$

and lower bounded by the lower bound:

$$LB(RDM_T) = \sum_{x \in S} (1 - Pr\{ADM_T \mid \overline{TL_T} \cap xF_T \cap xD_T\}) \times \qquad (27)$$
$$(1 - UB(TL_T \mid xF_T \cap xD_T)) \times Pr\{xF_T \mid xD_T\} \times LB(xD_T)$$

The term $UB(TL_T \mid xF_T \cap xD_T)$ appearing in the expressions (22), (25) and (27) can be obtained due to (18), more specifically:

$$UB(TL_T \mid xF_T \cap xD_T) = 1 - \prod_{\substack{i=1 \\ x \in MC^i}}^{k} \left(1 - \frac{\prod_{\substack{y \in MC^i \\ y \neq x}} UB(\overline{yD_T})}{LB(xD_T)}\right) \qquad (28)$$

in which $Pr(\overline{yD_T})$ has been upper bounded by $UB(\overline{yD_T})$ and $Pr(xD_T)$ lower bounded by $LB(xD_T)$.

Similarly, the term $LB(TL_T \mid xF_T \cap xD_T)$ appearing in the expressions (23), (25) and (27) can be obtained due to (20), specifically:

$$LB(TL_T \mid xF_T \cap xD_T) = \prod_{\substack{j=1 \\ x \notin MP^j}}^{p} \left(1 - \prod_{y \in MP^j} UB(yD_T)\right) \qquad (29)$$

The terms $Pr\{xF_T \mid xD_T\}$, $x \in S$ appearing in the expressions (22) to (27) are known, for example by means of statistics or rules established in the technical field, $Pr\{xF_T \mid xD_T\}$ simply representing the breakdown probability of the element x during the cycle T knowing that it was functioning at the beginning of the cycle.

The terms $Pr\{ADM_T \mid \overline{TL_T} \cap xF_T \cap xD_T\}$, $x \in S$ appearing in the expressions (24) to (27) are known by means of statistics or rules established in the technical field, $Pr\{ADM_T \mid \overline{TL_T} \cap xF_T \cap xD_T\}$ simply representing the probability of accepting a degraded operation due to breakdown of x during the cycle T not causing total system loss, knowing that x was functioning at the beginning of the cycle.

The terms $UB(xD_T)$ and $LB(xD_T)$ can be deduced by recurrence, from the expression (10):

$$UB(\overline{xD_{T+1}}) = \qquad (30)$$
$$UB(\overline{xD_T}) - LB(TL_T \cap \overline{xD_T}) + Pr\{DM_T \mid \overline{TL_T} \cap xF_T \cap xD_T\} \times$$
$$(1 - LB(TL_T \mid xF_T \cap xD_T)) \times Pr\{xF_T \mid xD_T\} \times UB(xD_T)$$

and $$LB(\overline{xD_{T+1}}) = \qquad (31)$$
$$LB(\overline{xD_T}) - UB(TL_T \cap \overline{xD_T}) + Pr\{DM_T \mid \overline{TL_T} \cap xF_T \cap xD_T\} \times$$
$$(1 - UB(TL_T \mid xF_T \cap xD_T)) \times Pr\{xF_T \mid xD_T\} \times LB(xD_T)$$
$$\text{with } UB(xD_T) = 1 - LB(\overline{xD_T}) \text{ and } LB(xD_T) = 1 - UB(\overline{xD_T}).$$

The term $UB(TL_T \cap \overline{xD_T})$ in the expression (31) can be obtained from:

$$UB(TL_T \cap \overline{xD_T}) = \qquad (32)$$
$$\sum_{\substack{y \in S \\ y \neq x}} \left(1 - \prod_{\substack{i=1 \\ y \in MC^i}}^{k} \left(LB(yD_T) - \prod_{\substack{z \in MC^i \\ z \neq x \\ z \neq y}} UB(\overline{zD_T}) \times UB(\overline{xD_T})\right)\right) \times$$
$$Pr\{yF_T \mid yD_T\}$$

Similarly, the term $LB(TL_T \cap \overline{xD_T})$ in the expression (30) can be obtained from:

$$LB(TL_T \cap \overline{xD_T}) = \sum_{\substack{y \in S \\ y \neq x}} \left(\prod_{\substack{j=1 \\ x, y \notin MP^i}}^{p} (1 - UB(MP_T^j)) \times Pr\{yF_T \mid yD_T\}\right) \times \qquad (33)$$
$$LB(yD_T) \times LB(\overline{xD_T})$$

Figure 5:
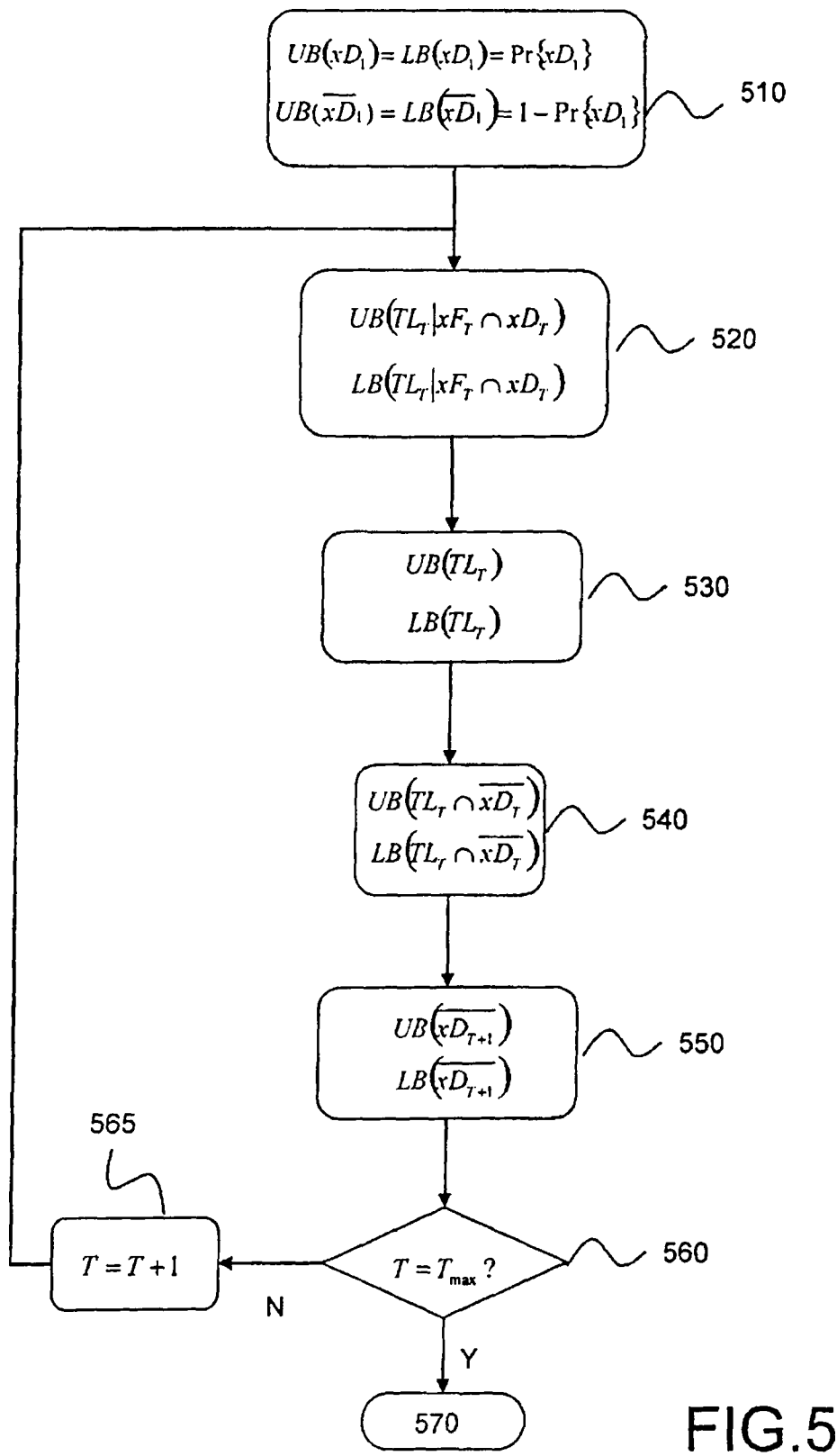
FIG. 5 illustrates an organigram of the estimation method of the replacement probability of an aircraft system, according to an embodiment of the invention.

The estimation method of the probability of total system loss S, and thus of replacement of its faulty elements, is illustrated in FIG. 5.

In step 510, the estimation method is initialized by the values $UB(xD_1) = LB(xD_1) = Pr\{xD_1\}$, $UB(\overline{xD_1}) = LB(\overline{xD_1}) = 1 - Pr\{xD_1\}$, $\forall x \in S$. $Pr\{xD_1\} = 1$ could be selected for example, i.e. it can be assumed that all elements are functioning at the beginning of the operation.

An iterative loop is then started, each iteration being relative to one cycle T.

At step 520, knowing the minimal cuts of the default tree of the system S, as well as the minimal paths of the corresponding reliability diagram, based on the expressions (28) and (29) the values $UB(TL_T \mid xF_T \cap xD_T)$ and $LB(TL_T \mid xF_T \cap xD_T)$ are calculated.

At step 530, the values of $UB(TL_T)$ and $LB(TL_T)$ are calculated based on the expressions (22) and (23), from the statistical data $Pr\{xF_T \mid xD_T\}$, $x \in S$.

At step 540, the values $UB(TL_T \cap \overline{xD_T})$ and $LB(TL_T \cap \overline{xD_T})$ are calculated based on the expressions (32) and (33), from the statistical data $Pr\{xF_T \mid xD_T\}$, $x \in S$.

At step 550, the values $UB(\overline{xD_{T+1}})$ and $LB(\overline{xD_{T+1}})$ initializing the following cycle are deduced from the values $UB(TL_T \mid xF_T \cap xD_T)$ and $LB(TL_T \mid xF_T \cap xD_T)$ calculated at step 520 and the values $UB(TL_T \cap \overline{xD_T})$ and $LB(TL_T \cap \overline{xD_T})$ calculated at step 540. The expressions (30) and (31) are used to do this.

A test is made at 560 to see if the desired number of cycles $T_{max}$ for the prediction is attained. In the negative, the cycle number in 565 is incremented and a return is made to step 520. In the affirmative, the prediction in 570 is terminated.

Although the estimation method according to the invention has been presented hereinabove within the scope of the total loss (TL) of an aircraft system, it is evident to the man skilled in the art that it similarly applies to estimation of the probabilities of acceptance of degraded operation (ADM) and refusal of degraded operation (RDM).

In practice, it is verified that the upper bounds UB(TL$_T$), UB(ADM$_T$), UB(RDM$_T$) are good approximations of the respective probabilities Pr{TL$_T$}, Pr(ADM$_T$) and Pr(RDM$_T$), determined by modelling of the system using the Markov process. However, this latter method needs particularly long calculation times, whereas the method according to the invention produces a reliable prediction result with a much shorter calculation time.

It can thus be rapidly determined if the breakdown rates of the elements of an aircraft system allow this system to reach the required degree of reliability. The impact of replacing an element of given reliability by a higher or lesser reliability element upon the reliability of the system can likewise be measured. This method can apply to a particular aircraft system or to the whole aircraft.

We shall now explain the method for predicting the operational interruption rate of an aircraft system, according to an embodiment of the invention. In summary, the operational interruption rate is the probability occasioned by an operation interruption during a time given interval.

An operation cycle T is considered as previously and a distinction is made, in case of breakdown, according to which there is or is not a total loss of the system S.

In the absence of total loss, the case of operation acceptance in degraded mode (ADM) and the case of operation refusal in degraded mode (RDM) are again distinguished. Supposing still that a single element can undergo breakdown during a cycle T, the operational interruption event relative to this cycle can be decomposed according to the partition:

$$OI_T \cap \overline{TL_T} = \bigcup_{x \in S} xOI_T \bigcap ADM_T \bigcap \overline{TL_T} \cap xF_T \cap xD_T \cup \bigcup_{x \in S} xOI_T \bigcap RDM_T \bigcap \overline{TL_T} \cap xF_T \cap xD_T \quad (34)$$

where xOI$_T$ is noted as the operational interruption event during the cycle T due to breakdown of x and, if required, a consecutive maintenance operation.

The probability of operational interruption during the cycle T, in the absence of total system loss, is deduced from (34):

$$Pr\{OI_T \cap \overline{TL_T}\} = \sum_{x \in S} [Pr\{xOI_T | .\} Pr\{ADM_T | xF_T \cap xD_T \cap \overline{TL_T}\} + \quad (35)$$
$$Pr\{xOI_T | \ldots \} Pr\{RDM_T | xF_T \cap xD_T \cap \overline{TL_T}\}] \times$$
$$(1 - Pr\{TL_T | xF_T \cap xD_T\}) * Pr\{xF_T \cap xD_T\}$$

where the terms Pr{xOI$_T$|.}=Pr{xOI$_T$|ADM$_T$∩xF$_T$∩xD$_T$∩$\overline{TL_T}$} and Pr{xOI$_T$|..}=Pr{xOI$_T$|RDM$_T$∩xF$_T$∩xD$_T$∩$\overline{TL_T}$} are known. In fact, for breakdown of x, the actions to be undertaken on this element (for example replacement, maintenance action) and their impacts in terms of interruption of the operation are known.

The terms Pr{ADM$_T$|xF$_T$∩xD$_T$∩$\overline{TL_T}$} and Pr{RDM$_T$|xF$_T$∩xD$_T$∩$\overline{TL_T}$} are likewise known by means of statistics or rules defined in the technical field, as already mentioned.

The terms Pr{TL$_T$|xF$_T$∩xD$_T$} are bounded by the values UB(TL$_T$|xF$_T$∩xD$_T$) and LB(TL$_T$|xF$_T$∩xD$_T$) obtained by iteration, as described in relation to FIG. 5. The probability Pr{OI$_T$∩$\overline{TL_T}$} is itself consequently bounded by an upper bound UB(OI$_T$∩$\overline{TL_T}$) and a lower bound LB(OI$_T$∩$\overline{TL_T}$):

$$UB(OI_T \cap \overline{TL_T}) \equiv \sum_{x \in S} [Pr\{xOI_T | .\} Pr\{ADM_T | xF_T \cap xD_T \cap \overline{TL_T}\} + \quad (36)$$
$$Pr\{xOI_T | \ldots \} Pr\{RDM_T | xF_T \cap xD_T \cap \overline{TL_T}\}] \times$$
$$(1 - LB(TL_T | xF_T \cap xD_T)) Pr\{xD_T\} UB(xD_T)$$

$$LB(OI_T \cap \overline{TL_T}) \equiv \sum_{x \in S} [Pr\{xOI_T | .\} Pr\{ADM_T | xF_T \cap xD_T \cap \overline{TL_T}\} + \quad (37)$$
$$Pr\{xOI_T | \ldots \} Pr\{RDM_T | xF_T \cap xD_T \cap \overline{TL_T}\}] \times$$
$$(1 - UB(TL_T | xF_T \cap xD_T)) Pr\{xD_T\} LB(xD_T)$$

In practice, the upper bound UB(OI$_T$∩$\overline{TL_T}$) makes a good approximation of the probability Pr{OI$_T$∩$\overline{TL_T}$}.

If the case of total loss occurring during the cycle T is now considered, the operational interruption event according to the partition can be decomposed:

$$OI_T \cap TL_T = \bigcup_{x \in S} xOI_T \cap TL_T \cap ((xF_T \cap xD_T) \cup (\overline{xD_T})) \quad (38)$$

The events featured under the sign «union» are not disjointed since total loss can occur following breakdown of an element x whereas any other element y of S is also (and has not been replaced by acceptance of a degraded mode of operation at an earlier step). However, we have the upper bound:

$$Pr\{OI_T \cap TL_T\} \leq \quad (39)$$
$$\sum_{x \in S} Pr\{xOI_T | .\} [Pr\{TL_T | xF_T \cap xD_T\} Pr\{xF_T | xD_T\} Pr\{xD_T\} + Pr\{TL_T \cap \overline{xD_T}\}]$$

and the lower bound:

$$Pr\{OI_T \cap TL_T\} \geq \quad (40)$$
$$\underset{x \in S}{\text{Max}}(Pr\{xOI_T | .\} [Pr\{TL_T | xF_T \cap xD_T\} Pr\{xF_T | xD_T\} Pr\{xD_T\} + Pr\{TL_T \cap \overline{xD_T}\}])$$

with the convention Pr{xOI$_T$|.}=Pr{xOI$_T$|TL$_T$∩((xF$_T$∩xD$_T$)∪($\overline{xD_T}$))}.

At the worst, all the elements of the system are to be replaced in parallel. Also, the absence of operational interruption at the system level supposes that none of the elements of the cut generates operational interruption during the replacement operation, which is translated by:

$$1 - Pr\{OI_T | TL_T\} \geq \left( \prod_{x \in S} (1 - Pr\{xOI_T | .\}) \right) \quad (41)$$

and consequently by:

$$Pr\{OI_T \cap TL_T\} \leq \left(1 - \prod_{x \in S}(1 - Pr\{xOI_T \mid .\})\right) Pr\{TL_T\} \leq \qquad (42)$$
$$\left(1 - \prod_{x \in S}(1 - Pr\{xOI_T \mid .\})\right) UB(TL_T)$$

Finally, the result from (39) and (42) is that the operational interruption probability $Pr\{OI_T \cap TL_T\}$ is upper bounded by the lesser of the two upper bounds, that is:

$$UB(OI_T \cap TL_T) \equiv \min \begin{pmatrix} \sum_{x \in S} Pr\{xOI_T \mid .\}[UB(TL_T \mid xF_T \cap xD_T)Pr\{xF_T \mid xD_T\}UB(xD_T) + UB(TL_T \cap \overline{xD_T})], \\ \left(1 - \prod_{x \in S}(1 - Pr\{xOI_T \mid .\})\right) UB(TL_T) \end{pmatrix} \qquad (43)$$

Also, the total system loss is necessarily due to a minimal cut $MC^i$. We have:

$$Pr\{OI_T \cap MC^i\} = Pr\{OI_T \mid MC^i\} Pr\{MC^i\} \qquad (44)$$

Following total loss, all the elements of this minimal cut must be replaced in parallel. So that operational interruption does not occur, no element of the minimal cut should itself cause operational interruption, which is translated by:

$$1 - Pr\{OI_T \mid MC^i\} \leq \prod_{x \in MC^i}(1 - Pr\{xOI_T \mid .\}) \qquad (45)$$

hence the upper bound:

$$Pr\{OI_T \mid TL_T\} \geq \min_{1 \leq i \leq k}\left(1 - \prod_{x \in MC^i}(1 - Pr\{xOI_T \mid .\})\right) \qquad (46)$$

where k is the number of minimal cuts of the system S.

Finally, it results from (40) and (46) that the probability of operational interruption $Pr\{OI_T \cap TL_T\}$ is lower bounded by the greater of the two lower bounds, or:

$$LB(OI_T \cap TL_T) \equiv \max \begin{pmatrix} \max_{x \in S}(PR\{xOI_T \mid .\}[LB(TL_T \mid xF_T \cap xD_T)Pr\{xF_T \mid xD_T\}LB(xD_T) + LB(TL_T \cap \overline{xD_T})]), \\ \min_{1 \leq i \leq k}\left(1 - \prod_{x \in MC^i}(1 - Pr\{xOI_T \mid .\})\right) LB(TL_T) \end{pmatrix} \qquad (47)$$

Figure 6:
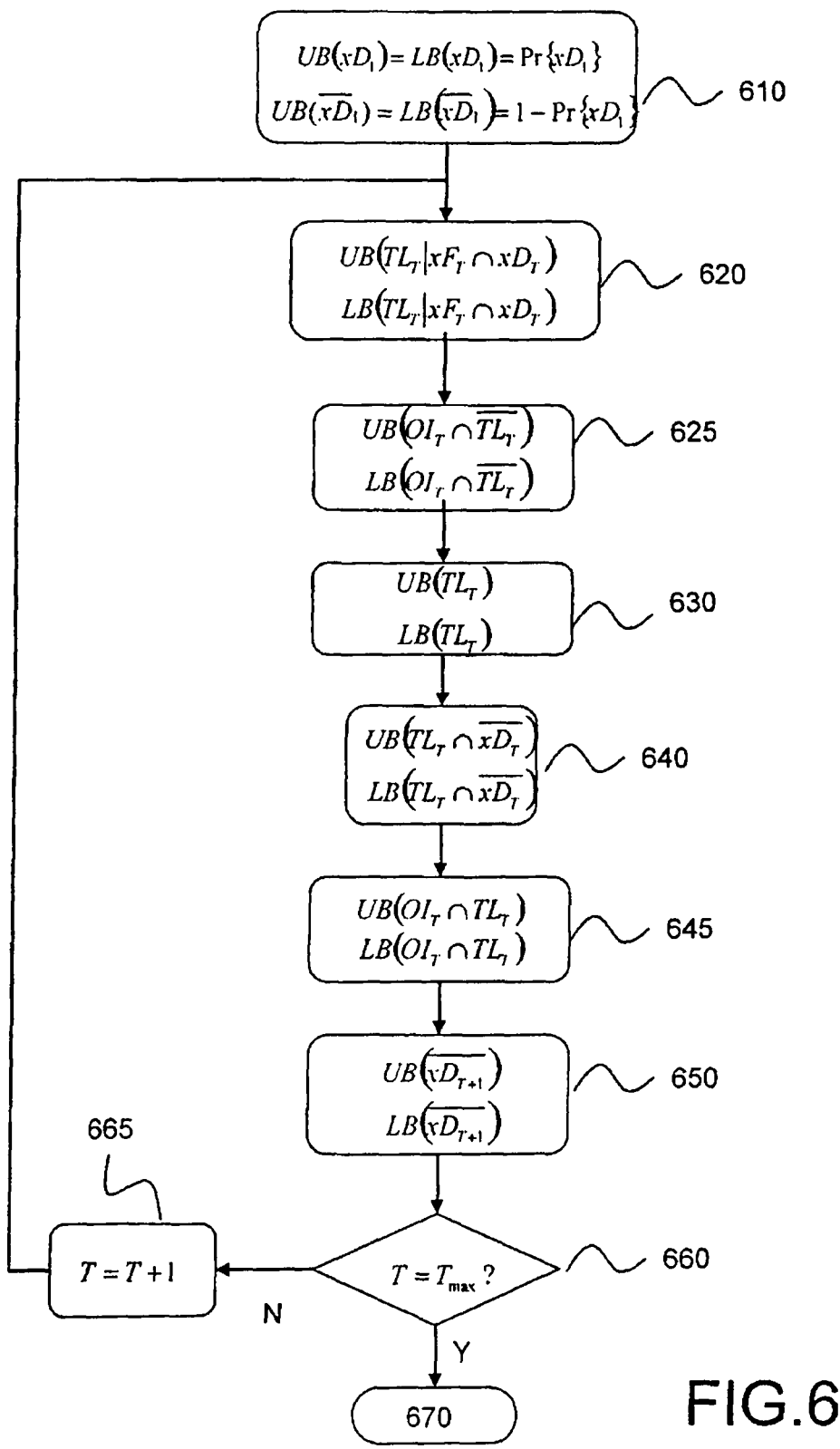
FIG. 6 illustrates an organigram of the estimation method of the operational interruption rate of an aircraft system according to an embodiment of the invention.

FIG. 6 shows an organigram of the estimation method of the operational interruption rate of an aircraft system S according to an embodiment of the invention. Steps 610 to 670 are identical to those corresponding to FIG. 5 and consequently will not be described further. The organigram comprises an additional step in 625 and/or an additional step in 645.

At step 625, $UB(OI_T \cap \overline{TL_T})$ is estimated according to the expression (36) from the values $LB(TL_T \mid xF_T \cap xD_T)$ obtained at step 620 and the current values $UB(xD_T) = 1 - LB(\overline{xD_T})$.

At this same step, $LB(OI_T \cap \overline{TL_T})$ is estimated according to the expression (37) from the values $UB(TL_T \mid xF_T \cap xD_T)$ obtained at step 620 and the current values $LB(xD_T) = 1 - UB(\overline{xD_T})$.

Similarly, at step 645, $UB(OI_T \cap TL_T)$ is estimated according to the expression (43), from the values $UB(TL_T \mid xF_T \cap xD_T)$ and $UB(TL_T \cap \overline{xD_T})$ obtained respectively at step 620 and at step 640 from the value $UB(TL_T)$ obtained at step 630 and the current values $UB(xD_T) = 1 - LB(\overline{xD_T})$.

At this same step, $LB(OI_T \cap TL_T)$ is estimated, according to the expression (47) from the values $LB(TL_T \mid xF_T \cap xD_T)$ and $LB(TL_T \cap \overline{xD_T})$ obtained respectively at step 620 and at step 640, from the value $LB(TL_T)$ obtained at step 630 and the current values $LB(xD_T) = 1 - UB(\overline{xD_T})$.

The estimation of the abovementioned values is made iteratively, as in FIG. 5.

The estimation method of the operational interruption rate according to the invention applies especially during the design phase of the aircraft to verify that the latter properly follows specifications. It can also apply during retrofitting of the apparatus.

The invention claimed is:

1. A prediction method implemented by a processing device of predicting the reliability of an aircraft system S onboard an aircraft and constituted by a plurality of elements, an operation of said aircraft comprising a sequence of cycles, each cycle comprising a flight phase and a ground station phase, the method comprising:
   an initialisation step of initializing, at the processing device, probabilities of normal operation or faultiness of each element $Pr\{xD_1\}$, $Pr\{\overline{xD_1}\}$ at the beginning of the operation, wherein $xD_1$ is an event corresponding to proper functioning of the element x at the beginning of a first cycle 1, $\overline{xD_1}$ is a complementary event to $xD_1$, and $Pr(A)$ indicates the probability of an event A;
   and an iterative loop, performed at the processing device, each iteration corresponding to an operation cycle and including:
   a first estimation step, for each element, of estimating upper $UB(TL_T \mid xF_T \cap xD_T)$ and lower $LB(TL_T \mid xF_T \cap xD_T)$ bounds of a conditional breakdown probability of the aircraft system if the said element breaks down during said cycle, the estimation being done from minimal cuts of a default tree, minimal paths of a reliability diagram of said aircraft system and upper and lower bounds of probability of normal operation $UB(xD_T)$; $LB(xD_T)$ or faultiness $UB(\overline{xD_T})$, $LB(\overline{xD_T})$ of different elements of the plurality of elements at the beginning of said cycle, wherein $TL_T$ is an event corresponding to total system loss during the cycle T, $xF_T$ is an event corresponding to breakdown of the element x during the cycle T, $xD_T$ is an event corresponding to proper functioning of the element x at the beginning of the cycle T, and "$\overline{xD_T}$" is a complementary event to $xD_T$;

a second estimation step of estimating upper $UB(TL_T)$ and lower $LB(TL_T)$ bounds of probabilities of breakdown of said aircraft system from the upper and lower bounds estimated at the first estimation step for the said different elements of the aircraft system and the respective probabilities of the different elements of the aircraft system of breaking down during a cycle $Pr\{xF_T|xD_T\}$;

a third estimation step, for each element of said aircraft system, of estimating upper $UB(TL_T \cap \overline{xD_T})$ and lower $LB(TL_T \cap \overline{xD_T})$ bounds of the conditional breakdown probability of the aircraft system during said cycle if the said element were faulty at the beginning of the cycle, the estimation being done from the minimal cuts of the default tree and the minimal paths of the reliability diagram of said aircraft system;

a fourth estimation step of predicting the reliability of the aircraft system by estimating upper and lower bounds of probability of normal operation $UB(xD_{T+1})$; $LB(xD_{T+1})$ or faultiness $UB(\overline{xD_{T+1}})$, $LB(\overline{xD_{T+1}})$ of the different elements of the aircraft system at the beginning of the following cycle, from the upper and lower bounds estimated by the first step, as well as the upper and lower bounds estimated by the third step, wherein $xD_{T+1}$ is an event corresponding to proper functioning of the element x at the beginning of the cycle T+1, and $\overline{xD_{T+1}}$ is a complementary event to $xD_{T+1}$.

2. The prediction method as claimed in claim 1, wherein, at each cycle, the breakdown probability of the aircraft system is predicted as the upper bound of breakdown probability of said aircraft system $UB(TL_T)$.

3. The prediction method as claimed in claim 1, wherein the estimation of the first estimation step is carried out by:

$$UB(TL_T \mid xF_T \cap xD_T) = 1 - \prod_{\substack{i=1 \\ x \in MC^i}}^{k} \left( 1 - \frac{\prod_{\substack{y \in MC^i \\ y \neq x}} UB(\overline{yD_T})}{LB(xD_T)} \right)$$

$$LB(TL_T \mid xF_T \cap xD_T) = \prod_{\substack{j=1 \\ x \notin MP^j}}^{p} \left( 1 - \prod_{y \in MP^j} UB(yD_T) \right)$$

where $UB(TL_T|xF_T \cap xD_T)$ and $LB(TL_T|xF_T \cap xD_T)$ are respectively the upper and lower bounds of the conditional breakdown probability of the aircraft system if the said element breaks down during said cycle, $UB(yD_T)$ and $UB(\overline{yD_T})$ are respectively the upper bounds of the probabilities that the element y functions and is faulty at the beginning of said cycle, $LB(xD_T)$ the lower bound of the probability that the element x functions at the beginning of said cycle, $MC^i$, $i=1, \ldots, k$ are the minimal cuts of the default tree of the aircraft system and $MP^j$, $j=1, \ldots, p$ are the minimal paths of the reliability diagram of the aircraft system, wherein $yD_T$ is an event corresponding to proper functioning of the element y at the beginning of cycle T, and $\overline{yD_T}$ is a complementary event to $yD_T$, k is an upper bound on the integer i, and p is an upper bound on the integer j.

4. The prediction method as claimed in claim 3, wherein the estimation of the second step is carried out by:

$$UB(TL_T) = \sum_{x \in S} UB(TL_T \mid xF_T \cap xD_T) \times Pr\{xF_T \mid xD_T\} \times UB(xD_T)$$

$$LB(TL_T) = \sum_{x \in S} LB(TL_T \mid xF_T \cap xD_T) \times Pr\{xF_T \mid xD_T\} \times LB(xD_T)$$

where $UB(TL_T)$ and $LB(TL_T)$ are respectively the upper and lower bounds of the probabilities of breakdown of said aircraft system, $Pr\{xF_T|xD_T\}$ the probability that the element x breaks down during said cycle, $UB(xD_T)$ and $LB(xD_T)$ are respectively the upper and lower bounds of the probability that the element x functions at the beginning of said cycle.

5. The prediction method as claimed in claim 3 wherein the third estimation step is carried out by:

$$UB(TL_T \cap \overline{xD_T}) =$$

$$\sum_{\substack{y \in S \\ y \neq x}} \left( 1 - \prod_{\substack{i=1 \\ y \in MC^i}}^{k} \left( LB(yD_T) - \prod_{\substack{z \in MC^i \\ z \neq x \\ z \neq y}} UB(\overline{zD_T}) \times UB(\overline{xD_T}) \right) \right) \times$$

$$Pr\{yF_T \mid yD_T\}$$

$$LB(TL_T \cap \overline{xD_T}) = \sum_{\substack{y \in S \\ y \neq x}} \left( \prod_{\substack{j=1 \\ x, y \notin MP^i}}^{p} (1 - UB(MP_T^j)) \times Pr\{yF_T \mid yD_T\} \right) \times$$

$$LB(yD_T) \times LB(\overline{xD_T})$$

where $UB(TL_T \cap xD_T)$ and $LB(TL_T \cap xD_T)$ are respectively the upper and lower bounds of the conditional breakdown probability of the aircraft system during said cycle if the said element were faulty at the beginning of the cycle, $LB(yD_T)$ is the lower bound of the probability that the element y functions at the beginning of the cycle, $UB(\overline{zD_T})$ is the upper bound of the probability that the element z is faulty at the beginning of the cycle, $UB(\overline{xD_T})$ and $LB(\overline{xD_T})$ are respectively the upper and lower bounds of the probabilities that the element x is faulty at the beginning of the cycle, $Pr\{yF_T|yD_T\}$ the probability that the element y breaks down during the cycle, $MC^i$, $i=1, \ldots, k$ are the minimal cuts of the default tree of the aircraft system and $MP^j$, $j=1, \ldots, p$ are the minimal paths of the reliability diagram of the aircraft system, $UB(MP_T^j)$ the upper bound of the probability that the minimal path $MP^j$ is constituted by elements which function during the cycle T, wherein $yF_T$ is an event corresponding to breakdown of the element y during the cycle T.

6. The prediction method as claimed in claim 3 wherein:

$$UB(\overline{xD_{T+1}}) = UB(\overline{xD_T}) - LB(TL_T \cap \overline{xD_T}) + Pr\{DM_T \mid \overline{TL_T} \cap xF_T \cap xD_T\} \times$$

$$(1 - LB(TL_T \mid xF_T \cap xD_T)) \times Pr\{xF_T \mid xD_T\} \times UB(xD_T)$$

$$LB(\overline{xD_{T+1}}) = LB(\overline{xD_T}) - UB(TL_T \cap \overline{xD_T}) + Pr\{DM_T \mid \overline{TL_T} \cap xF_T \cap xD_T\} \times$$

$$(1 - UB(TL_T \mid xF_T \cap xD_T)) \times Pr\{xF_T \mid xD_T\} \times LB(xD_T)$$

where $UB(\overline{xD_{T+1}})$ and $LB(\overline{xD_{T+1}})$ are respectively the upper and lower bounds of the probability that the element x does not function at the beginning of the following cycle, $UB(xD_T)$ and $LB(xD_T)$ are respectively the upper bounds and lower bounds of the probability that the element x functions at the beginning of the current cycle, $UB(\overline{xD_T})$ and $LB(\overline{xD_T})$ are respectively the upper bounds and lower bounds of the probability that the element x does not function at the beginning of the current cycle, $UB(TL_T \cap \overline{xD_T})$ and $LB(TL_T \cap \overline{xD_T})$ are respectively the upper and lower bounds of the conditional breakdown probability of the aircraft system during said cycle if the element x were faulty at the beginning of the cycle, $Pr\{xF_T|xD_T\}$ is the probability that the element x breaks down during the current cycle, $Pr\{DM_T|\overline{TL_T} \cap xF_T \cap xD_T\}$ is the probability that the operation is continued, even though the element x has broken down during the current cycle without causing however the breakdown of said aircraft system, wherein $DM_T$ is an event corresponding to a decision of the cycle T to continue operation in degraded mode despite a breakdown of x.

7. A prediction method of the operational interruption rate of an aircraft system S onboard an aircraft and constituted by a plurality of elements, the operation of said aircraft comprising a sequence of cycles, each cycle comprising a flight phase and a ground station phase, wherein the reliability of said system is predicted by the prediction method as claimed in any one of claims 3 to 6 and in that upper $UB(OI_T \cap \overline{TL_T})$ and lower $LB(OI_T \cap \overline{TL_T})$ bounds of probability of operational interruption of said aircraft system in the absence of breakdown of the latter are estimated at each said iteration, the estimation of the upper bound $UB(OI_T \cap \overline{TL_T})$ of probability of operational interruption being obtained from the respective lower bounds $LB(TL_T|xF_T \cap xD_T)$ of the conditional probabilities of breakdown of the aircraft system during said cycle for each element x breaking down during this cycle, as well as the respective upper bounds $UB(xD_T)$ of the probabilities that each element x functions at the beginning of said cycle, wherein $OI_T$ is an event corresponding to operational interruption of the aircraft system during the cycle T, and $\overline{TL_T}$ is an event corresponding to a complementary event to a total system loss during the cycle T.

8. The prediction method as claimed in claim 7, wherein the upper bound of probability of operational interruption of said aircraft system in the absence of breakdown is estimated by:

$$UB(OI_T \cap \overline{TL_T}) \equiv \sum_{x \in S} [Pr\{xOI_T|.\}Pr\{ADM_T|xF_T \cap xD_T \cap \overline{TL_T}\} +$$
$$Pr\{xOI_T|...\}Pr\{RDM_T|xF_T \cap xD_T \cap \overline{TL_T}\}] \times$$
$$(1 - LB(TL_T|xF_T \cap xD_T))Pr\{xD_T\}UB(xD_T)$$

and its lower bound by:

$$LB(OI_T \cap \overline{TL_T}) \equiv \sum_{x \in S} [Pr\{xOI_T|.\}Pr\{ADM_T|xF_T \cap xD_T \cap \overline{TL_T}\} +$$
$$Pr\{xOI_T|...\}Pr\{RDM_T|xF_T \cap xD_T \cap \overline{TL_T}\}] \times$$
$$(1 - UB(TL_T|xF_T \cap xD_T))Pr\{xD_T\}LB(xD_T)$$

where $$Pr\{xOI_T|.\} = Pr\{xOI_T|ADM_T \cap xF_T \cap xD_T \cap \overline{TL_T}\}$$

and $$Pr\{xOI_T|...\} = Pr\{xOI_T|RDM_T \cap xF_T \cap xD_T \cap \overline{TL_T}\},$$

wherein $xOI_T$ is an operational interruption event during the cycle T due to a breakdown of the element x, $ADM_T$ is an event of operation in a degraded mode being accepted and subject to possible maintenance, $RDM_T$ is an event of operation in degraded mode being refused and requiring replacement or repair of a default element, wherein $Pr(A)$ indicates the probability of an event A.

9. A prediction method of the operational interruption rate of an aircraft system S onboard an aircraft and constituted by a plurality of elements, the operation of said aircraft comprising a sequence of cycles, each cycle comprising a flight phase and a ground station phase, wherein the reliability of said aircraft system is predicted by the prediction method as claimed in any one of claims 3 to 6, and in that, upper $UB(OI_T \cap TL_T)$ and lower $LB(OI_T \cap TL_T)$ bounds of probability of operational interruption of said aircraft system are estimated at each said iteration in case of breakdown of the latter, wherein $OI_T$ is an event corresponding to operational interruption of the aircraft system during the cycle T, the estimation of the upper bound $UB(OI_T \cap TL_T)$ of probability of operational interruption being obtained from the respective upper bounds $UB(TL_T|xF_T \cap xD_T)$ of the conditional probabilities of breakdown of the aircraft system during said cycle for each element x of the system breaking down during the cycle, the respective upper bounds $UB(TL_T \cap \overline{xD_T})$ of the conditional probabilities of breakdown of the aircraft system for each element x faulty at the beginning of said cycle, the respective upper bounds $UB(xD_T)$ of the probabilities of good operation of each element x at the beginning of the cycle, as well as an upper bound $UB(TL_T)$ of breakdown probability of the aircraft system during the cycle, the estimation of the lower bound $LB(OI_T \cap TL_T)$ of probability of operational interruption being obtained from the respective lower bounds $LB(TL_T|xF_T \cap xD_T)$ of the conditional probabilities of breakdown of the aircraft system during said cycle for each element x of the aircraft system breaking down during the cycle, the respective lower bounds $LB(TL_T \cap \overline{xD_T})$ of the conditional probabilities of breakdown of the aircraft system for each element x faulty at the beginning of said cycle, the respective lower bounds $LB(xD_T)$ of the probabilities of good operation of each element x at the beginning of the cycle, as well as a lower bound $LB(TL_T)$ of breakdown probability of the aircraft system during the cycle.

10. The prediction method as claimed in claim 1, wherein the upper bound of probability of operational interruption of said aircraft system in case of breakdown is estimated by:

$$UB(OI_T \cap TL_T) \equiv \min \begin{pmatrix} \sum_{x \in S} Pr\{xOI_T | .\}[UB(TL_T | xF_T \cap xD_T)Pr\{xF_T | xD_T\}UB(xD_T) + UB(TL_T \cap \overline{xD_T})], \\ \left(1 - \prod_{x \in S}(1 - Pr\{xOI_T | .\})\right)UB(TL_T) \end{pmatrix}$$

and the lower bound by:

$$LB(OI_T \cap TL_T) \equiv \max \begin{pmatrix} \max_{x \in S}(Pr\{xOI_T | .\}[LB(TL_T | xF_T \cap xD_T)Pr\{xF_T | xD_T\}LB(xD_T) + LB(TL_T \cap \overline{xD_T})]), \\ \min_{1 \leq i \leq k}\left(1 - \prod_{x \in MC^i}(1 - Pr\{xOI_T | .\})\right)LB(TL_T) \end{pmatrix}$$

where $Pr\{xOI_T|.\} = Pr\{xOI_T | TL_T \cap ((xF_T \cap xD_T) \cup (\overline{xD_T}))\}$ and $MC^i$, $i=1, \ldots, k$ are the minimal cuts of the default tree of the aircraft system, wherein $OI_T$ is an event corresponding to operational interruption of the aircraft system during the cycle T, and $xOI_T$ is an operational interruption event during the cycle T due to a breakdown of the element x.

* * * * *